United States Patent
Schlicher et al.

(10) Patent No.: US 12,307,410 B2
(45) Date of Patent: May 20, 2025

(54) METHOD, SYSTEM AND COMPUTER PROGRAM PRODUCT FOR TRANSACTION ON BLOCKCHAIN FOR CONDITIONALLY ASSIGNED CRITERIA

(71) Applicant: AVC Innovations LLC, Spearfish, SD (US)

(72) Inventors: Bob G. Schlicher, Knoxville, TN (US); David J. Todd, Spearfish, SD (US); Niels C. Skjoldager, Redington Beach, FL (US)

(73) Assignee: AVC Innovations, LLC, Spearfish, SD (US)

( * ) Notice: Subject to any disclaimer, the term of this patent is extended or adjusted under 35 U.S.C. 154(b) by 0 days.

(21) Appl. No.: 18/600,613

(22) Filed: Mar. 8, 2024

(65) Prior Publication Data
US 2025/0021929 A1   Jan. 16, 2025

Related U.S. Application Data

(60) Provisional application No. 63/526,928, filed on Jul. 14, 2023.

(51) Int. Cl.
  G06Q 10/0835  (2023.01)
  G06F 21/30   (2013.01)

(52) U.S. Cl.
  CPC ......... *G06Q 10/0835* (2013.01); *G06F 21/30* (2013.01); *G06Q 2220/00* (2013.01)

(58) Field of Classification Search
  CPC ............ G06Q 10/083; G06Q 10/0832; G06Q 10/0833; G06Q 10/0835; G06Q 10/0837; G06Q 10/0838
  See application file for complete search history.

(56) References Cited

U.S. PATENT DOCUMENTS

| 7,716,619 B2 | 5/2010 | Braceras et al. |
| 9,855,785 B1 | 1/2018 | Nagelberg et al. |

(Continued)

OTHER PUBLICATIONS

Okazaki, Yotaro. "Unveiling the potential of blockchain for customs." WCO Research paper 45 (2018): 1-24. (Year: 2018).*
ISR & WO from PCT/US 24/ 19448 with four references.

*Primary Examiner* — Emmett K. Walsh
(74) *Attorney, Agent, or Firm* — Reston Law Group, LLP; Ralph P. Albrecht

(57) ABSTRACT

A computer-implemented method, system or program product of providing a transaction on a blockchain for conditionally assigned criteria, including: electronically receiving a document via aGUI, an IoT MessageInterface, or Application Programming Interface (API); electronically receiving payment via the GUI, IoT MessageInterface, or API; electronically storing document and payment in cloud-based or on premise storage, a node of data network or storage system; electronically transferring via blockchain user interface or blockchain gateway API; electronically processing data stipulated as conditionally assigned criteria on blockchain; or Distributed Ledger Technology (DLT) including routing and adding IoT data to asset record when conditions are met; electronically authenticating data with a timestamp, and encoding; electronically updating a data record including adding IoT data to asset record as a blockchain entry of an Non-Fungible Token (NFT) or a cryptographically linked off-chain entry, when conditionally assigned criteria are fulfilled; electronically notifying a permissioned participant; or authorizing permissioned participant by GUI.

19 Claims, 6 Drawing Sheets

(56) References Cited

U.S. PATENT DOCUMENTS

| | | |
|---|---|---|
| 10,505,726 B1 | 12/2019 | Andon et al. |
| 10,540,654 B1 | 1/2020 | James et al. |
| 10,614,661 B2 | 4/2020 | Doney et al. |
| 10,789,239 B2 | 9/2020 | Ventura et al. |
| 10,951,409 B2 | 3/2021 | Konda et al. |
| 10,972,274 B2 | 4/2021 | Redpath et al. |
| 10,991,185 B1 | 4/2021 | Luthra et al. |
| 11,038,718 B2 | 6/2021 | Simons |
| 11,048,788 B2 | 6/2021 | Witchey et al. |
| 11,070,564 B2 | 7/2021 | McIver et al. |
| 11,138,580 B1 | 10/2021 | Koch |
| 11,170,092 B1 | 11/2021 | Liang |
| 11,171,782 B2 | 11/2021 | Tang et al. |
| 11,200,569 B1 | 12/2021 | James et al. |
| 11,295,359 B1 * | 4/2022 | Mullins .............. G06Q 10/0837 |
| 2004/0221162 A1 | 11/2004 | Kongtcheu |
| 2009/0077386 A1 | 3/2009 | Simonian |
| 2016/0283920 A1 | 9/2016 | Fisher et al. |
| 2017/0046664 A1 | 2/2017 | Haldenby et al. |
| 2018/0232693 A1 * | 8/2018 | Gillen ................ G06Q 10/0834 |
| 2019/0130416 A1 | 5/2019 | Boudville et al. |
| 2019/0279197 A1 | 9/2019 | Wright et al. |
| 2020/0280444 A1 | 9/2020 | Tang et al. |
| 2020/0294128 A1 | 9/2020 | Howard |
| 2021/0067342 A1 * | 3/2021 | Guinard ................ H04L 9/0866 |
| 2022/0058633 A1 | 2/2022 | Yantis et al. |
| 2022/0253868 A1 | 8/2022 | Scarseli |

\* cited by examiner

METHOD, SYSTEM AND COMPUTER PROGRAM PRODUCT FOR TRANSACTION ON BLOCKCHAIN FOR CONDITIONALLY ASSIGNED CRITERIA

Background of the Disclosure

Field of the Disclosure

The disclosure relates generally to supply chain, and more particularly to supply chain management systems.

Related Art

Prior to this disclosure, tangible (e.g., physical) paper documentation was the medium used to track assets and supply chain management.

Some conventional systems supplement purely manual paper processing with minimal use in conjunction with computing systems and devices to distribute required information to an authorizing user in a supply chain such as by email. The approval by the authorizing user was conditioned on receipt of all required criteria, including documentation and any associated payments. Any of the emailed documents may be printed on paper, including the final approval. For example, the document may be a contract, a lease, a bill of sale, license, custom clearance, and so forth. Conventional systems are inefficient and need improvement.

Improved systems that overcome shortcomings of the conventional systems are needed.

SUMMARY OF THE INVENTION

According to an example embodiment, a system, method and/or computer program product may be set forth including an example computer implemented method of providing for a transaction on a blockchain for conditionally assigned criteria, may include at least one electronic computer processor coupled to at least one electronic memory storage device and coupled via at least one communications network interface to at least one data communications network, the method may include: electronically receiving, by the at least one electronic computer processor, at least one document via at least one graphical user interface (GUI), at least one Internet Of Things (IoT) message interface, or at least one application programming interface (API); electronically receiving, by the at least one electronic computer processor, at least one applicable payment via at least one or more of: the at least one graphical user interface (GUI), at least one IoT message interface, or at least one application programming interface (API); electronically storing, by the at least one electronic computer processor, said at least one document and said at least one applicable payment in at least one data store comprising at least one or more of: at least one cloud based or on premise storage; at least one node of the at least one data communications network; or at least one storage system; electronically transferring, by the at least one electronic computer processor, via at least one blockchain user interface, or at least one blockchain gateway API from said at least one data store; electronically processing, by the at least one electronic computer processor, data stipulated as at least one conditionally assigned criteria on at least one or more of: at least one blockchain; or at least one distributed ledger technology (DLT) including routing and adding IoT data to the asset record when conditions are met; electronically authenticating, by the at least one electronic computer processor, said data with at least one electronic timestamp, and encoding, by the at least one electronic computer processor, with at least one encoder; electronically updating, by the at least one electronic computer processor, at least one data record of said data, including adding IoT data to the asset record comprising at least one or more of at least one blockchain entry including at least one Non-Fungible Token (NFT), or at least one cryptographically linked off-chain entry, when said at least one conditionally assigned criteria is fulfilled; electronically notifying, by the at least one computer processor, via the at least one GUI at least one or more of: at least one permissioned participant; or at least one authorizing permissioned participant, according to an example embodiment. In one example embodiment, the data record may include an NFT, and may optionally further include the cryptographically linked off-chain entry.

According to one example embodiment, an example system of providing for a transaction on a blockchain for conditionally assigned criteria, the system comprising: at least one electronic computer processor, coupled to at least one electronic memory storage device and coupled via at least one communications network interface, coupled to at least one data communications network, the system comprising wherein said at least one electronic computer processor is configured to: electronically receive, by the at least one electronic computer processor, at least one document via at least one or more of: at least one graphical user interface (GUI), at least one IoT message interface, or at least one application programming interface (API); electronically receive at least one applicable payment via the at least one or more of: the at least one GUI, at least one IoT message interface, or at least one API; electronically store said at least one document and said at least one applicable payment in at least one data store comprising at least one or more of: at least one cloud based or on premise storage; at least one node of the at least one data communications network; or at least one storage system; electronically transfer via at least one blockchain user interface or at least one blockchain gateway API from said at least one data store; electronically process data stipulated as at least one conditionally assigned criteria on at least one or more of: at least one blockchain; or at least one distributed ledger technology (DLT) including being configured to route and add IoT data to the asset record when conditions are met; electronically authenticate said data with at least one electronic timestamp, and encode with at least one encoder; electronically update at least one data record of said data comprising at least one or more of: at least as a blockchain entry including a Non-Fungible Token (NFT) or with a cryptographically linked off-chain entry, when said at least one conditionally assigned criteria is fulfilled; electronically notify via the at least one graphical user interface (GUI) at least one or more of: at least one permissioned participant; or at least one authorizing permissioned participant, according to an example embodiment. In one example embodiment, the data record may include an NFT, and may optionally further include the cryptographically linked off-chain entry.

According to yet another example embodiment, an example computer program product may be embodied on a computer accessible nontransitory storage medium, and may include at least one instruction, which when executed on at least one electronic computer processor may perform a method of providing for a transaction on a blockchain for conditionally assigned criteria, which may include, e.g., but is not limited to, at least one electronic computer processor coupled to at least one electronic memory storage device and coupled via at least one communications network interface to at least one data communications network, the method may include: electronically receiving at least one document via at least one or more of: at least one graphical user interface (GUI), at least one Internet of Things (IoT) message interface, or at least one application programming interface (API); electronically receiving at least one applicable payment via the at least one or more of: the at least one GUI, the at least one IoT message interface, or at least one API; electronically storing said at least one document and said at least one applicable payment in at least one data store comprising at least one or more of: at least one cloud based or on premise storage; at least one node of the at least one data communications network; or at least one storage system; electronically transferring via at least one blockchain user interface or at least one blockchain gateway API from said at least one data store; electronically processing data stipulated as at least one conditionally assigned criteria on at least one or more of: at least one blockchain; or at least one distributed ledger technology (DLT); electronically authenticating said data with at least one electronic timestamp, and encoding with at least one encoder; electronically updating at least one data record of said data including adding IoT data to the asset record comprising at least one or more of: as at least one blockchain entry including a Non-Fungible Token (NFT); or a cryptographically linked off-chain entry, when said at least one conditionally assigned criteria is fulfilled; electronically notifying via the at least one graphical user interface (GUI) at least one or more of: at least one permissioned participant; or at least one authorizing permissioned participant, according to an example embodiment. In one example embodiment, the data record may include an NFT, and may optionally further include the cryptographically linked off-chain entry.

Embodiments of the claimed invention relate to the transmission of data items, according to an example embodiment, which may include a rule set that can be modified by permissioned participants in a supply chain utilizing blockchain for authentication and application of smart contracts for self-execution based on conditions, according to an example embodiment.

More specifically, example embodiments of the claimed invention may include a method which may include a new architectural system in which the data items may be published to an authorizing permissioned participant and may be received on a computing device, according to an example embodiment. For example, when all data as conditioned in the rule set are fulfilled, the system may be encoded to create a new data record and the authorizing participant may determine disposition of the good or product, according to an example embodiment.

Example embodiments may relate to tracking of assets with a Blockchain, according to an example embodiment.

Other example embodiments may relate to blockchain-based supply chain certification systems and methods, according to an example embodiment.

Example embodiments relate to blockchain-based systems for efficient storage and retrieval of disparate supply side transaction information, according to an example embodiment.

An example feature of embodiments of the claimed invention may include providing a transaction on a blockchain for conditionally assigned criteria that may overcome the disadvantages of the methods of this general type and of the conventional solutions, according to an example embodiment.

This invention provides that all documentation and payments, if necessary, are received in a digital form from any of the permissioned participants, including the authorizing agent to a data storage unit, according to an example embodiment. The unit serves to authenticate items as accurate and are selected as conditions necessary to fulfill criteria as stipulated in a self-executing platform and allow authorizing permissioned participant to determine final disposition of product or good in the supply chain, according to an example embodiment.

This invention provides that all documentation and payments, if necessary, are received in a digital form from any of the permissioned participants, including the authorizing agent to a data storage unit, according to an example embodiment. The unit serves to authenticate items as accurate and are selected as conditions necessary to fulfill criteria as stipulated in a self-executing platform and allow authorizing permissioned participant to determine final disposition of product or good in the supply chain, according to an example embodiment.

Implementation of this invention may include providing an innovative approach for authenticating multi-tiered transactions involving permissioned participants and authorizing permissioned participants of data and information stored on a blockchain using smart contracts for determining final disposition, according to an example embodiment.

For example, in the example embodiment of the application of this specification, customs clearance may be used to verify the accuracy of documentation for products and goods, according to an example embodiment. This clearance may be an evaluation process used by nation-states to move products and goods for entry, exit, or transit through the country upon the validation of requirements stipulated by the country's laws, regulations, or policies, according to an example embodiment. Furthermore, despite the fact that each nation-state may tailor the documentation required for clearances, the general clearance process involves a manual process that includes a paper process with computing devices to view or store information as needed, according to an example embodiment. For example, a summarized workflow for permissioned participants of an import, according to an example embodiment.

1) A shipment of goods arrives at the port for entry, according to an example embodiment.
2) A customs officer examines the documentation in a paper and digital form associated with the goods and the specified import duties and taxes, if any, according to an example embodiment.
3) If determined that requirements for customs approval are not satisfied, then shipment may be detained or returned until a customs broker, the buyer, seller, or a financing representative, reconciles the trade requirements, according to an example embodiment.
4) After reconciliation, customs clears the goods for entry into the country or transit through the country to reach its final destination, according to an example embodiment.

This invention provides that all documentation and payments, if necessary, are received in a digital form to the authorizing permission participant and all permissioned participants in the transaction are enabled to transmit digital data information according to required criteria, according to an example embodiment. The architecture of the system includes user interface(s), a digital storage unit(s), and automation platform to transmit notification upon fulfillment of designated criteria, according to an example embodiment.

The foundation of blockchain may be its ability to store data in an immutable fashion enabling secure and transparent transactions and the publication including imprint of authenticity, such as a timestamp, of such information to permissioned parties, according to an example embodiment. Blockchain and derivatives thereof in various types of industries are constructive through the transmission of data, information, rule sets along a distributed ledger to the permissioned participants, according to an example embodiment. Smart contracts are configured to be self-executing on a blockchain when predetermined conditions are fulfilled, thereby enabling the transition to succeeding step, according to an example embodiment.

The systems and methods disclosed herein relate to transactions on a blockchain, which may include data and information, held within a storage unit (encrypted with meta data to identify its source) until matched with criteria in rule set, according to an example embodiment. One embodiment may be the data information submitted to the system may be a single transaction, according to an example embodiment. Another embodiment may be all documents submitted, including metadata to identify the author or submitter, to the system are coalesced within a single transaction, according to an example embodiment. Such transactions may be digitally stored in encrypted form within the system, platform, cloud, node, or computing device, according to an example embodiment.

The data storage system may include of two parts: an on-chain component, referring to data stored inside of the blockchain system, and an off-chain component for data not stored in the blockchain but in another storage such as a database, according to an example embodiment. The relationship between the on-chain and off-chain components may be made possible by each containing an identically computed value called a hash on the data and having related cryptographic keys, according to an example embodiment. A participant, through their authorized account, can query one or all the data storage system(s), according to an example embodiment.

In another embodiment of the invention, the architecture may provide the data and any information required by the authorizing permissioned user of the supply chain may be published to their computing device, such as documents, payment amount, and any product identifier information all located on the blockchain; attestation of the documents may be performed by a computing device equipped with digital signature capabilities, where the authenticity and integrity of the documents are verified using cryptographic techniques or verification of the attestation involving cross-referencing the digital signatures with a trusted authority's public key or employing a decentralized consensus mechanism within the blockchain network to confirm the validity of the attestation with the evidence of the attestation recorded on the blockchain; synchronization between the authenticated documents and information and the criteria stipulated in the rule set and also reflected in the smart contract; and when the conditions are fulfilled, the system generates a new update record that may be received by all permissioned participants on a computing device and the authorizing permissioned participant(s), who makes determination which may be last transaction in supply chain for final disposition of goods, according to an example embodiment.

In this embodiment, upon approval, the products may be released and the next user in the supply chain may gain access to the goods, according to an example embodiment.

This embodiment may reduce rejection of the movement of goods, services, or products for importation, exportation, or transit for nation-states, according to an example embodiment. And more specifically, may address inaccurate and missing information, such as Harmonized Tariff Schedule (HTS) or Export Control Classification Number (ECCN) codes, inaccurate or antiquated market valuation of the consignment, according to an example embodiment.

Although the invention may be illustrated and described herein as summarized in a transaction on blockchain for conditionally assigned criteria, the invention should not be limited to the details shown in those embodiments because various modifications and structural changes may be made without departing from the spirit of the invention while remaining within the scope and range of equivalents, according to an example embodiment.

The construction and method of operation of the invention and additional objects, features and/or advantages of embodiments of the disclosure or the invention may be best understood from the following description of specific embodiments when read in connection with the accompanying drawings, according to an example embodiment.

BRIEF DESCRIPTION OF THE VARIOUS EXAMPLE VIEWS OF THE DRAWINGS

This present disclosure will be fully understood with reference to the following detailed description when taken in conjunction with the figures, herein:

Figure 5:
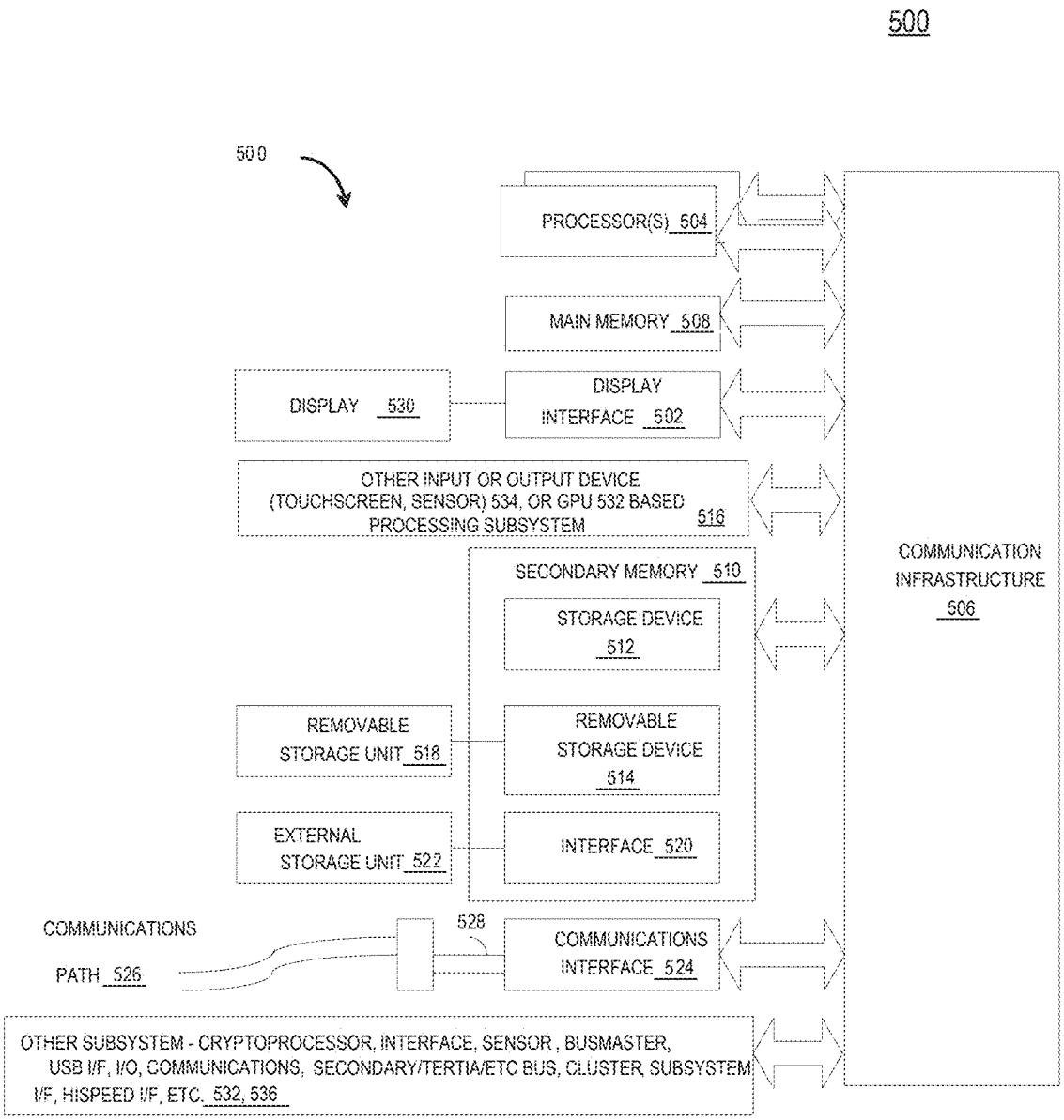
Figure 6:
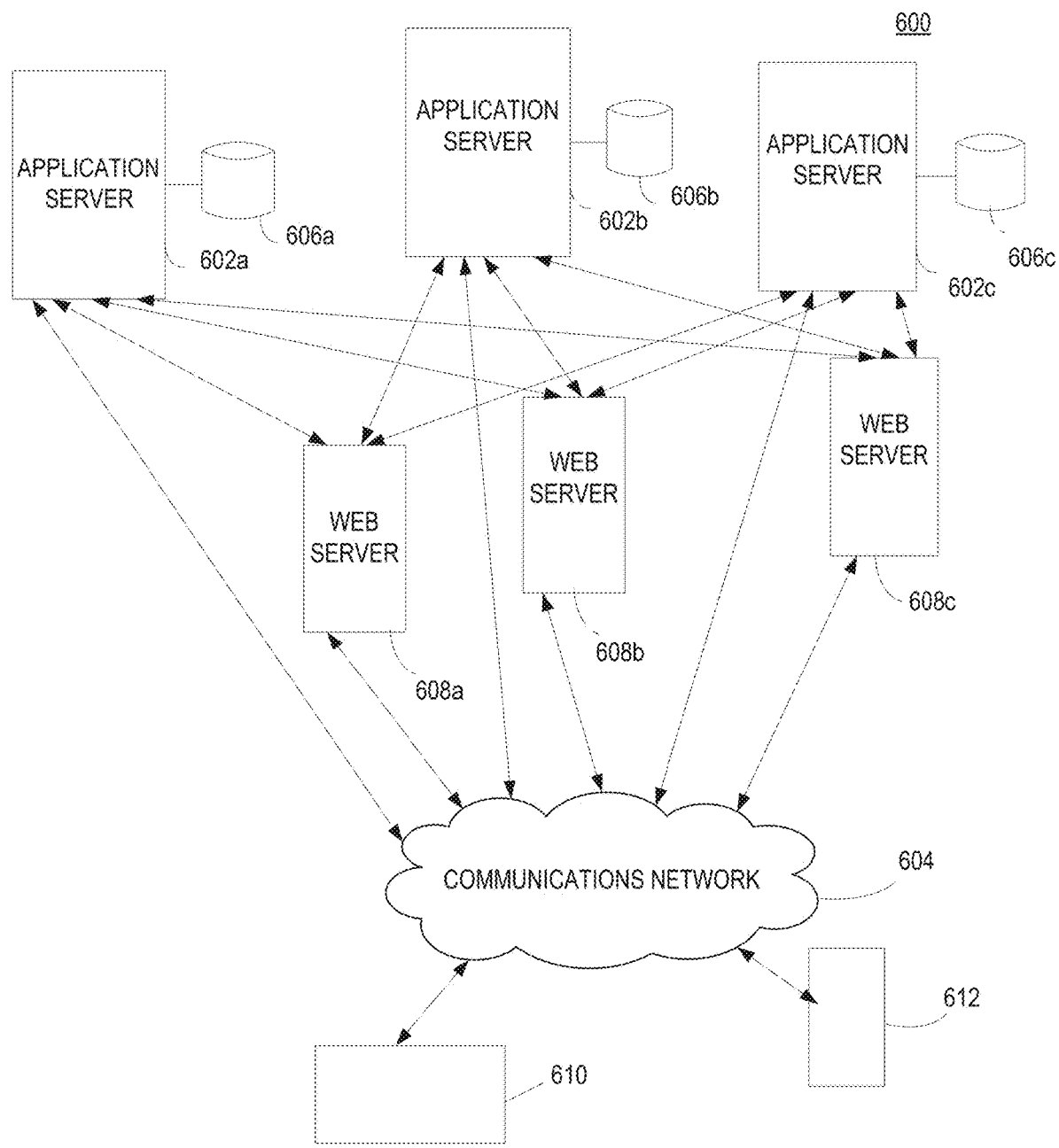

FIG. 5 depicts an example embodiment of an example component level example hardware architecture for an example computing device as may be used for any of various example hardware subsystem components of an example system, according to one example embodiment; and FIG. 6 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF VARIOUS EXAMPLE EMBODIMENTS OF THE INVENTION

The various embodiments of the invention described herein should not be limited to the description, even with reference to the accompanying figures and drawings depicted, but only with respect to the claims. The invention may be embodied in different forms and should not be restricted as set forth here.

The various embodiments of the invention described herein should not be limited to the description, even with the reference to the accompanying figures and drawings depicted herein, according to an example embodiment. The invention may be embodied in different forms and should not be restricted at set forth, according to an example embodiment. The following provides a logical view of the system, according to an example embodiment.

Figure 1A:
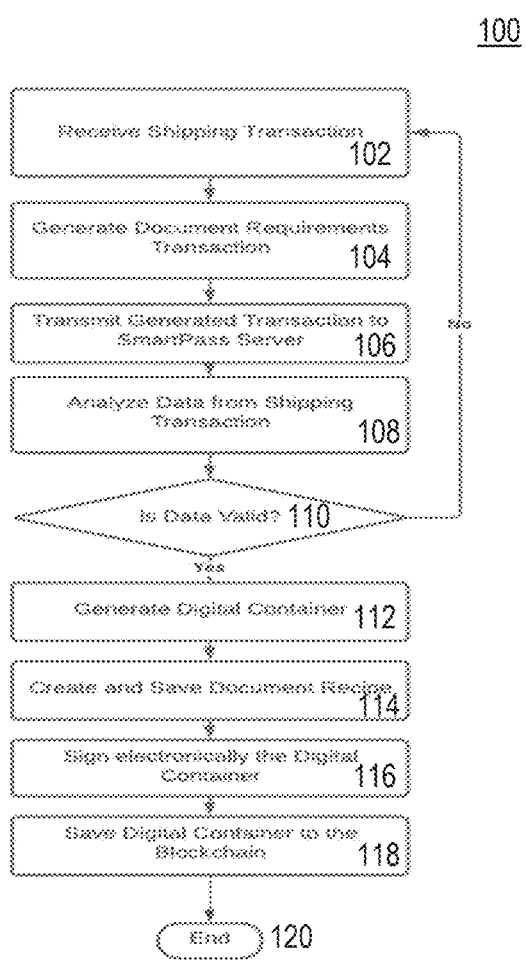
FIGS. 1A and 1B show a flow chart of an example of the logic used to develop the criteria for data documentation and process used to verify the accuracy of the data to facilitate the decision by an authorized participant, according to the implementation of the present disclosure, according to an example embodiment.
Figure 1B:
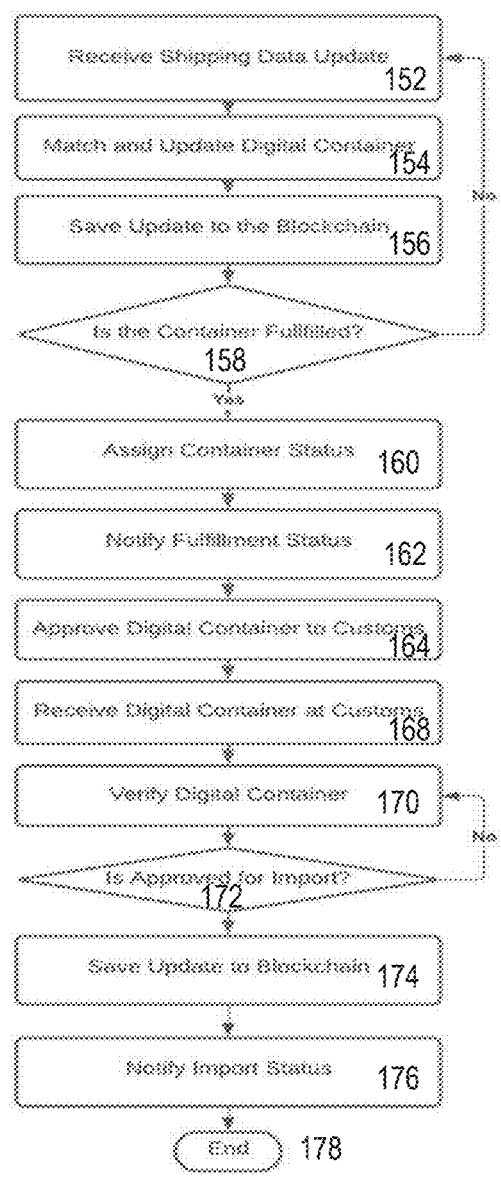

FIGS. 1A and 1B show a flow chart 100, 150, collectively, of an example of the logic used to develop the criteria for data documentation and process used to verify the accuracy of the data to facilitate the decision by an authorized participant, according to the implementation of the present disclosure, according to an example embodiment, discussed further below.

According to an example embodiment, flow diagram 100 of FIG. 1A may begin with 102.

Figure 3:
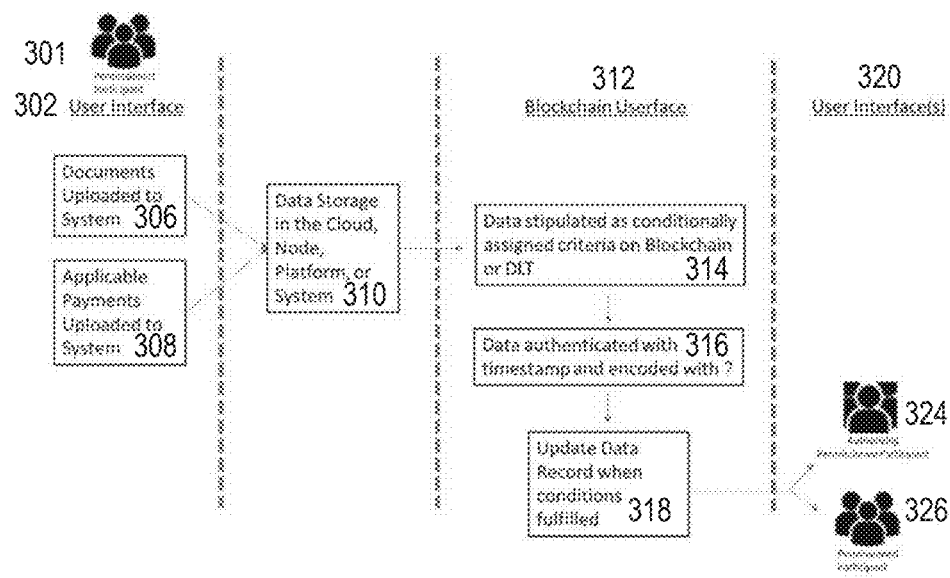
FIG. 3 depicts a flow diagram of an example process that permissioned participants and authorizing permissioned participants of supply chain and the transmission of authenticated documentation within a created architectural system to participants, according to the present disclosure, according to an example embodiment.
Figure 4:
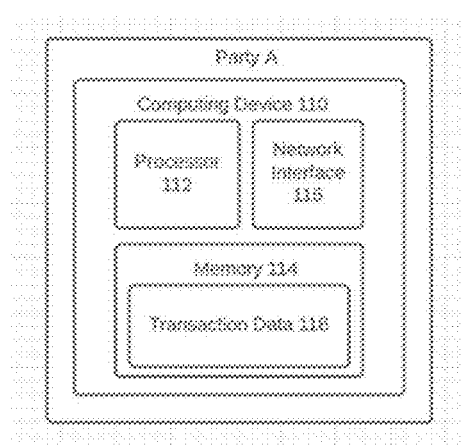
FIG. 4 is a schematic drawing illustrating component of the computing system, according to an example embodiment.

In 102, flow diagram 100 may receive a shipping transaction at an example computer system, such as that shown in FIGS. 3 and 4, according to an example embodiment. From 102, flow diagram 100 may continue with 104, according to example embodiment.

In 104, flow diagram 100 may generate document requirements for the example shipping transaction of 102, according to an example embodiment. From 104, flow diagram 100 may continue with 106, according to example embodiment.

In 106, flow diagram 100 may transmit a generated transaction (generated in 104) to an example SmartPass Server, according to an example embodiment. From 106, flow diagram 100 may continue with 108, according to example embodiment.

In 108, flow diagram 100 may analyze data from the shipping transaction, according to an example embodiment. From 108, flow diagram 100 may continue with 110, according to example embodiment.

In 110, flow diagram 100 may determine whether the data is valid, and if the data is valid may continue with 112, according to an example embodiment. From 110, if the data is determined to be not valid, then flow diagram 100 may continue with 102, according to example embodiment.

In 112, flow diagram 100 may generate a digital container, according to an example embodiment. From 112, flow diagram 100 may continue with 114, according to example embodiment.

In 114, flow diagram 100 may create and save an example document recipe, according to an example embodiment. From 114, flow diagram 100 may continue with 116, according to example embodiment.

In 116, flow diagram 100 may sign electronically the digital container, according to an example embodiment. From 116, flow diagram 100 may continue with 118, according to example embodiment.

In 118, flow diagram 100 may save the example digital container to the blockchain, according to an example embodiment. From 118, flow diagram 100 may continue with 120, according to example embodiment.

In 120, flow diagram 100 may immediately end, according to an example embodiment. From 120, flow diagram 100 may continue with flow diagram 150 of FIG. 1B, according to example embodiment.

According to another example embodiment, FIG. 1B is an alternative to FIG. 1A, where a shipping transaction has already been created, and the data of the transaction is merely being updated, according to one example embodiment.

According to an example embodiment, flow diagram 150 of FIG. 1B may begin with 152.

In 152, flow diagram 150 may receive a shipping data update at an example computer system, such as of the devices shown in FIGS. 3 and 4, according to an example embodiment. From 152, flow diagram 150 may continue with 154, according to example embodiment.

In 154, flow diagram 150 may match and update a digital container, according to an example embodiment. From 154, flow diagram 150 may continue with 156, according to example embodiment.

In 156, flow diagram 150 may wave an example update from 154 to a blockchain, according to an example embodiment. From 156, flow diagram 150 may continue with 158, according to example embodiment.

In 158, flow diagram 150 may determine whether the container is fulfilled, and if the container is determined to be fulfilled may continue with 160, according to an example embodiment. From 158, if the container is determined to not be fulfilled, then flow diagram 150 may continue with 152, according to example embodiment.

In 160, flow diagram 150 may assign a container status, according to an example embodiment. From 160, flow diagram 150 may continue with 162, according to example embodiment.

In 162, flow diagram 100 may notify fulfillment of status, according to an example embodiment. From 162, flow diagram 150 may continue with 164, according to example embodiment.

In 164, flow diagram 150 may approve an example digital container to customs, according to an example embodiment. From 164, flow diagram 150 may continue with 168, according to example embodiment.

In 168, flow diagram 150 may receive the example digital container at customs, according to an example embodiment. From 168, flow diagram 150 may continue with 170, according to example embodiment.

In 170, flow diagram 150 may verify the example digital container, according to an example embodiment. From 170, flow diagram 150 may continue with 172, according to example embodiment.

In 172, flow diagram 150 may determine whether the container is approved for import, and if the container is determined to be approved for import may continue with 174, according to an example embodiment. From 172, if the container is determined to not be approved for import, then flow diagram 150 may continue with 170, according to example embodiment.

In 174, flow diagram 150 may save an update to the blockchain, according to an example embodiment. From 174, flow diagram 150 may continue with 176, according to example embodiment.

In 176, flow diagram 100 may notify import status, according to an example embodiment. From 176, flow diagram 150 may continue with 178, according to example embodiment.

In 178, flow diagram 150 may immediately end, according to an example embodiment.

Figure 2:
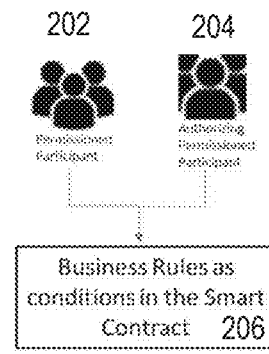
FIG. 2 depicts the users of the system and users stipulating the rule set for the conditionally assigned criteria, according to the implementation of the present disclosure, according to an example embodiment.

FIG. 2 depicts in diagram 200, an example illustration of examples of users of the system and users stipulating the rule set for the conditionally assigned criteria, according to the implementation of the present disclosure, according to an example embodiment, discussed further below. Diagram 200 may include an example one or more permissioned participant(s) 202 and one or more authorizing permissioned participant(s) 204, according to an example embodiment, each of the users having their own computing devices (not shown) and may using those devices create one or more business rule(s) as conditions in an example smart contract 206, according to an example embodiment.

FIG. 3 depicts an example data flow diagram 300 of an example process that permissioned participants and authorizing permissioned participants of FIG. 2 may use in processing an example supply chain and the transmission of authenticated documentation within an example created architectural system to example participants, according to the present disclosure, according to an example embodiment, discussed further below.

In 306, according to an example embodiment, data flow diagram 300 may include a user interface (UI) 302 being used by an example permissioned participant 301 and may in 306 upload example documents to a system using the UI 302, according to an example embodiment. From 306, data flow diagram 300 may continue with 310, according to an example embodiment.

In 308, according to an example embodiment, data flow diagram 300 may include a user interface (UI) 302 being used by an example permissioned participant 301 and may in 308 upload example applicable payments to the system using the UI 302, according to an example embodiment. From 308, data flow diagram 300 may continue with 310, according to an example embodiment.

In 310, according to an example embodiment, data flow diagram 300 may include data storage in an example cloud, a node, a platform, or a system 310, which may receive the uploaded documents of 306, and example applicable payments uploaded of 308 to the system 310, according to an example embodiment. From 310, data flow diagram 300 may continue with 314, according to an example embodiment.

In 314, according to an example embodiment, data flow diagram 300 may include block chain user interface (userface) 312, which may from data storage 310 receive data stipulated as conditionally assigned criteria on blockchain or DLT 314, according to an example embodiment. From 314, data flow diagram 300 may in the blockchain userface 312 continue with 316, according to an example embodiment.

In 316, according to an example embodiment, data flow diagram 300 may include the block chain userface 312, which may from the received data stipulated as conditionally assigned criteria on blockchain or DLT 314, may authenticate data with a timestamp and may be encoded with a question coding 316, according to an example embodiment. From 316, data flow diagram 300 may in the blockchain userface 312 continue with 318, according to an example embodiment.

In 318, according to an example embodiment, data flow diagram 300 may include the block chain userface 312, which may from the authenticated data with a timestamp and encoding 316, may update an example data record when conditions are fulfilled, according to an example embodiment. From 318, data flow diagram 300 may from the blockchain userface 312 continue with providing to user interface 320, according to an example embodiment.

In 320, according to an example embodiment, data flow diagram 300 may include the user interface 320 receiving from the block chain userface 312, the updated example data record when conditions were fulfilled 318, and may provide that updated data to one or more of the authorizing permissioned participant(s) 324, and/or one or more of the permissioned participatnt(s) 326, according to an example embodiment. From 318, data flow diagram 300 may from the blockchain userface 312 continue with providing to user interface 320, according to an example embodiment.

FIG. 4 is a schematic drawing 400 illustrating example components of an example embodiment of the computing system 110 of an example party A, according to an example embodiment, discussed further below. FIG. 4 depicts an example schematic view 400 of an illustrative system, which may include a system of an example user party A as illustrated (although it could also represent a party B or other, etc.), and system 400 may include a computing device 110, which may include one or more processor(s) 112, one or more network interface(s) 116, and may include a memory 114 and/or transaction data 118, which may be stored in memory device 110, or may be stored in an example removable memory device (not shown) 110a, and the data 118 may be acted upon by one or more operations and/or other processing instructions, which may be executed in processor 112, and an example embodiment of the system 400 is described further with reference to FIG. 5, according to the invention, according to an example embodiment.

FIG. 5 depicts an example embodiment of an example component level example hardware architecture 500 for an example computing device as may be used for any of various example hardware subsystem components of an example system, according to one example embodiment, discussed further below.

FIG. 6 depicts an example embodiment illustrating an example system level hardware architecture 600 for an example application server, web server embodiment of an example service provider system for providing an example software architecture of various example subsystem components of an example networking system, which may be used to implement, according to one example embodiment, discussed further below.

In one general aspect, according to an example embodiment, all the permissioned participants may be sources of information necessary to formulate the business rules between the parties, according to an example embodiment. For example, the business rules, according to an example embodiment, may articulate the data, information, including amounts of payments required by the authorizing permissioned party for final determination on a single platform, according to an example embodiment. In the case of custom clearances, the requirements for a single shipment, according to an example embodiment, may be improved.

An authorized permissioned party, according to an example embodiment, may use a Graphical User Interface (GUI) operating on any type of platform of mobile, desktop, laptop, console, or tablet through an example Web browser or an application, who may proceed, according to an example embodiment, with the following general process to develop the list of required data and information, according to an example embodiment.

The method may be in various implementation, according to an example embodiment. For example, in the case of custom clearances, a permissioned party describes the goods, inputs shipping data, purchase order data, including arrival port, arrival date and time, according to an example embodiment.

Implementation of the method may include documents in digital form uploaded to the cloud, for example, importing goods into a country, such required documents could include, according to an example embodiment, e.g., but not limited to, import customs declaration form, import permit or import approval for restricted goods, commercial invoice, purchase order, export packing list, bill of lading (B/L), description of product, arrival notice, certificate of country origin, chambers of commerce, export license, legal permit, letter of credit, dock/warehouse receipt, air waybill, insurance certificate or insurance policy, statistical declaration, Halal certificate, etc., according to an example embodiment.

Documents, such as PDFs and image files, may be uploaded using, according to an example embodiment, a remote computing device such as a mobile, tablet, or desktop using an application or a browser connected to a system application programming interface (API) that may be located on the Internet by its Universal Resource Locator (URL) address, according to an example embodiment. The document, according to an example embodiment, may be digitally transferred to the system where data describing the document also called meta data, such as its title, may be saved to the blockchain and the full document that may contain images and video may be saved to a database, a file storage data volume, or a distributed file storage, where more than one copy of the document may be saved and accessed in different data computing and storages, according to an example embodiment. Saving to the blockchain may be identified as 'on-chain', according to an example embodiment. Saving on a separate storage, but related to some record usually by some cryptographical means in the blockchain, may be referred to as 'off-chain', according to an example embodiment.

An authenticated time-stamp, according to an example embodiment, on the blockchain occurs, and/or may be captured, for each transaction, and for this example submission of each document may be considered a transaction, according to an example embodiment. The aggregation of all documents into a single or another method, according to an example embodiment, may be to coalesce documents as discussed in the business rules to generate, according to an example embodiment, a single digital data record, according to an example embodiment.

The blockchain of entries, according to an example embodiment, may be accumulated in a data storage in the cloud as a Distributed Ledger Technology (DLT) and among a distributed network of permissioned participant, according to an example embodiment. The blockchain storage, according to an example embodiment, may be in the data structure of a ledger that may be persisted on a data volume mounted to a disk storage system, according to an example embodiment. Each participating node of the blockchain network, according to an example embodiment, may have a separate storage system, according to an example embodiment. Each participant may be authorized with an associated level of access to a server/storage system assigned to a blockchain node and typically does not have access to the other server/storage systems within the blockchain network, according to an example embodiment.

Within the server/storage system, customized algorithms may exist to, according to an example embodiment, e.g., but not limited to, calculate the duties, taxes, and any fees associated with the shipment, which may have been generated from the received data, data entry, etc., according to an example embodiment.

A SmartPass may be an instance of a conditionally assigned criteria as the rule-based storage unit described herein, according to an example embodiment. The SmartPass, according to an example embodiment, may contain a prescription of the list of required documents to be received and contains rules for computing fees and cargo arrival time events, according to an example embodiment. The SmartPass, according to an example embodiment, may be created in one of two example ways, according to an example embodiment: 1) after an application is filled out online by a permissioned participant may be completed and submitted to system, according to an example embodiment, and 2) after a specific transaction has been received in a pre-arranged process, according to an example embodiment that may automatically create and assign the SmartPass documents and rules, according to an example embodiment.

The computing device, according to an example embodiment, may perform a match between the receive data and documents and the SmartPass contents; a match in the system may be digitally check marked assigned with the SmartPass including a timestamp, a computed hash of the matched document, and a unique uniform resource identified (URI) for the document storage, according to an example embodiment. Each document has a URI that identifies its unique storage location, according to an example embodiment. If a match may be not found, the document may be still assigned with the SmartPass and saved with the SmartPass data record with similar digital check mark, according to an example embodiment. For each change to the SmartPass that involves receiving a document or an edit to the SmartPass data, such as updating arrival time, the SmartPass change may be submitted to the blockchain smart contract, according to an example embodiment. The smart contract saves the changed data record to the blockchain, according to an example embodiment.

As according to the smart contract, once all fulfilled for the SmartPass criteria, the system may generate a message, according to an example embodiment that may be transmitted to all permissioned participants in the blockchain, according to an example embodiment. The method may also, according to an example embodiment, include update messages, including alerts for unintended transactions that are detected on the blockchain or when an expected item or transaction did not transpire within a specified time frame creating an unfulfilled criteria or failure within the smart contract, according to an example embodiment.

The method, according to an example embodiment, may provide access to the stored data of a SmartPass by the URI provided in the notification. The method may also provide the authorizing permission participant, according to an example embodiment, access through a GUI, command interface, or API in the permissioned participant system interface.

The authorizing permissioned participant, according to an example embodiment, may adjust the fees, taxes, and duties of the SmartPass, which may be reflected within the computing devices and data storage through an editor in the GUI, command interface, or API that can be evaluated and distributed by the smart contract to update the SmartPass record in the DLT, if applicable, according to an example embodiment. In another implementation, the participant indicates on the GUI which triggers the server/cloud for approval, rejection with stipulations for fulfillment, or rejection with assigned hold, according to an example embodiment. The system identifies each one of those outcomes as a transaction through the smart contract on the blockchain with time-stamped for authentication, according to an example embodiment. The entry may be received by all permissioned participants through the blockchain DLT mechanism, according to an example embodiment.

The system may determine, according to an example embodiment, using self-executing logic, including the use of a smart contract, for content determination, according to an example embodiment. If all pre-determined conditions are fulfilled, according to an example embodiment, then the data record may be saved in the same transaction or can be evaluated using an event-driven processor that may perform, according to an example embodiment, the evaluation in a separate transaction, according to an example embodiment.

After the smart contract determines, according to an example embodiment, the completion of receiving the prescribed documents and the prescribed conditions have been met for the SmartPass, the smart contract may create and save a completion data record to the blockchain, according to an example embodiment. As part of the transaction for the document upload or data update, the smart pass, according to an example embodiment, may after saving this blockchain record returns the completion status to the caller of the transaction, according to an example embodiment. The caller can create a notification to inform customs about the completion of the SmartPass, according to an example embodiment. Another smart contract or process, according to an example embodiment, which may be contained within the blockchain software can monitor the updates to the blockchain ledger, according to an example embodiment. When this smart contract identifies the ledger entry for the completion of the SmartPass, it may send notifications to customs and the SmartPass may be made available to authorized customs users, according to an example embodiment.

Observations from one skilled in the art, aspects of the present invention may be embodied as a system, method, or computer program product, according to an example embodiment. Accordingly, aspects of the present invention may take the form of an entirely hardware embodiment, an entirely software embodiment (including firmware, resident software, micro-code, program code) or an embodiment combining software and hardware aspects that may be referred to herein as a "module" or "system", according to an example embodiment. Furthermore, aspects of the present invention may take the form of a computer program product embodied in one or more computer readable medium(s) having installed computer readable program code, according to an example embodiment.

The flowchart and block diagrams in the figures illustrate the architecture, functionality, and operation of possible implementations of systems, methods and computer program products according to various embodiments of the present invention, according to an example embodiment. In this regard, each block in the flowchart or block diagrams may represent a module, segment, or portion of code, which comprises one or more executable instructions for implementing the specified logical function(s), according to an example embodiment. It should also be noted that, in some alternative implementations, the functions noted in the block may occur out of the order noted in the figures, according to an example embodiment. For example, two blocks shown in succession may, in fact, be executed substantially concurrently, or the blocks may sometimes be executed in the reverse order, depending upon the functionality involved, according to an example embodiment. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, according to an example embodiment.

Any combination of one or more computer readable medium(s) may be utilized, according to an example embodiment. A computer readable storage medium may be, for example, an electronic, magnetic, optical, electromagnetic, infrared, or semiconductor system, apparatus, or device, or any suitable combination of the foregoing, according to an example embodiment. More specific examples, but non-exhaustive list of the computer readable storage medium would include the following: a portable computer diskette, a thumb disk, a hard disk, a cloud storage, a random access memory (RAM), a read-only memory (ROM), a solid state Disk (SSD) or nonvolatile memory (NVMe), an erasable programmable read-only memory (EPROM or Flash memory), a portable compact disc read-only memory (CD-ROM), an optical storage device, a magnetic storage device, or any suitable combination of the foregoing, according to an example embodiment. In the context of this document, a computer readable storage medium may be any tangible medium that can contain or store a program for use by or in connection with an instruction execution system, apparatus, or device, according to an example embodiment.

Program code installed on a computer readable medium may be transmitted using any appropriate medium, including as example wireless, wire cable, optical fiber cable, RF, etc., or any suitable combination of the foregoing, according to an example embodiment.

Computer program code for carrying out operations for aspects of the present invention may be written in any combination of one or more programming languages with a subset example of object-oriented, procedural, and other forms as Python, Go, Java, JavaScript, C++, C, and scripting languages including operating system level shells, according to an example embodiment. The program code may execute entirely on the user's computer, partly on the user's computer, as a stand-alone software package, partly on the user's computer and partly on a remote computer or entirely on the remote computer or server, according to an example embodiment. In the latter scenario, the remote computer may be connected to the user's computer through any type of network, including a local area network (LAN) or a wide area network (WAN), or the connection may be made to an external computer (for example, through the Internet using an Internet Service Provider), according to an example embodiment.

Aspects of the present invention are described with reference to flowchart illustrations and/or block diagrams of methods, apparatus (systems) and computer program products according to embodiments of the invention, according to an example embodiment. It will be understood that each block of the flowchart illustrations and/or block diagrams, and combinations of blocks in the flowchart illustrations and/or block diagrams, can be implemented by computer program instructions, according to an example embodiment. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks, according to an example embodiment.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks, according to an example embodiment.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks, according to an example embodiment.

Referring to FIG. 4, as illustrated, diagram 400 may represent an example computing device as may be used for example components of FIGS. 1-3, as well as FIG. 5. A user A may include a computing device 110, for example, a personal computer, laptop, tablet, smart phone, smart wearable device, server, cloud computing system, or any other computing device that may be used to submit or settle transactions between party A and other parties, according to an example embodiment. Computing device 110 may include at least one processor 112, memory 114, and a network interface 116, according to an example embodiment. Processor 112 may include, for example, a microcontroller, Field Programmable Gate Array (FPGA), or any other processor that may be configured to perform various operations, according to an example embodiment. Processor 112 may be configured to execute software instructions, according to an example embodiment. These instructions may be stored, for example, in memory 114, according to an example embodiment.

Memory 114 may include, for example, non-transitory computer readable media in the form of volatile memory, such as random access memory (RAM) and/or cache memory or others, according to an example embodiment. Memory 114 may include, for example, other removable/non-removable, volatile/nonvolatile storage media, according to an example embodiment. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, according to an example embodiment.

Network interface 116 may be configured to transmit and receive data or information between parties via wired or wireless connections, according to an example embodiment. For example, network interface 116 may utilize wireless technologies and communication protocols such as Bluetooth, WIFI (e.g., 802.11a/b/g/n, etc.), cellular networks (e.g., CDMA, GSM, M2M, and 3G/4G/4G LTE, etc.), near-field communications systems, satellite communications, or any other form of communication that allows computing device 112 to transmit or receive information, according to an example embodiment. Network interface 116 may allow computing device 112 to communicate directly with computing devices associated with one or more other parties, according to an example embodiment. In some aspects, network interface 116 may communicate computing devices of other parties via an intermediary network, for example, a local area network (LAN), wide area network (WAN), the Internet, or other similar networks, according to an example embodiment.

In some aspects, a user may store transaction data 118 in memory 114, according to an example embodiment.

Transaction data 118 may include, for example, an identification of any transactions that are currently pending for a user, an amount or value associated with the pending transactions, and an identification of a counterparty for each transaction, according to an example embodiment. In some aspects, transaction data may also include an indication of whether the counterparty for each transaction may be a fully-trusted party or a fully un-trusted party, according to an example embodiment. For example, transaction data 118 may be a registry of all pending transactions for a party A, according to an example embodiment.

FIG. 5 depicts an example embodiment of a hardware architecture block diagram 500 for an example computing or communications device as may be used for any of various example buyer devices, example seller devices, example financial institution devices, example nonfungible token (NFT) devices, notification and/or authentication devices, example state machines, example shipment arrived state machine, example at customs state machine, example pay tax fees computing device, example shipment cleared computing device, example cargo departed port for in country file paperwork state machine event processor, example source device, example shipment event data receiver, example shipment event queue, example start SmartPass, example shipment in transit service, example shipment ready for customs service, example shipment action queue, example edit SmartPass Docs service, example enable doc upload service, example update SmartPass service, example shipment record database state machine, example rule engine, example rule repository, example rule editor, example engine execution core, example reporting subsystem, example SmartPass state diagram execution processors, state machines, example event data feeds, event data input layer devices, SmartPass record devices, Asset state engine devices, SmartPass State rules, rule engine execution, data output layer and action output layer devices, action event generators, after state processors, flow diagram execution processors, example state machine devices, flow diagram elements, state engines, event receiver devices, source devices, asset state devices, event queue devices, action queue devices, app asset state databases and/or services, FSM framework components, SmartHub devices, cryptocurrency exchange devices, as well as example computing devices of users, mobile devices, network communication components, routers, gateways, etc., according to an example embodiment of the present invention.

FIG. 5 depicts an exemplary schematic block diagram 500 illustrating an exemplary computer/communications device hardware architecture as may be used in various exemplary components of an exemplary embodiment including user devices various example buyer devices, example seller devices, example financial institution devices, example non-fungible token (NFT) devices, notification and/or authentication devices, example SmartHub devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, enduser devices, operations center devices, client and/or server devices, network routers, gateways, access points, and the like, according to various exemplary embodiments.

FIG. 5 depicts an exemplary schematic block diagram 500 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 500 may include any of various exemplary computer systems as may be used as an external computer device, an internal and/or STB or SOC, a mobile device, a wearable, a client, or server, web server, application server, and/or any other of the computing devices included in the other drawings, according to various exemplary embodiments. FIG. 5 depicts an exemplary diagram 500 illustrating an exemplary computer/communications device hardware architecture as may be used in various components of exemplary embodiments of the present invention. FIG. 5 depicts an exemplary view 500 of exemplary computer systems such as those represented in FIGS. 1-5, 6, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 500, 500, etc., as may be used in implementing an exemplary embodiment of the present invention. FIG. 5 depicts an exemplary embodiment of a computer system that may be used in computing devices including those shown and not shown, such as, e.g., but not limited to, service provider computing devices, SmartHub systems, buyer computing devices, supplier computing devices, digital financial services computing devices, public blockchain for proxy NFT computing devices, data repository processing and/or storage computing devices, network devices, communication devices, authentication devices, notification devices, requesting devices, response devices, cryptocurrency exchange related devices, NFT related devices, traditional financial services and/or fiat currency processing computing devices, electronic funds transfer (EFT) related devices, network monitoring and analysis devices of example operations illustrated example environment 600, computing devices 500, devices, servers, application servers, web servers, other wearable and/or mobile devices, sensor capture devices, routers, gateways, data network communication equipment, etc., according to an exemplary embodiment of the present invention. FIG. 5 depicts an exemplary embodiment of a computer system that may be used as client device, a server device (not shown), a network component, router, packet monitor/analyzer, server device, storage, and/or cloud based or premise storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, IOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 5.

The computer system 500 may include one or more processors, such as, e.g., but not limited to, processor(s) 504, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 532, cryptographic processors such as, e.g., but not limited to, encryption/decryption processor 536, quantum computers, etc. The processor(s) 504 may be connected to a communication infrastructure 506 (e.g., but not limited to, a communications bus, crossover bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530, and/or GPU 532, and/or touchscreen 534, and/or other input or output, and/or input and output device, sensor-based device, etc.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, DVD, Personal Cloud storage, redundant array of inexpensive disks (RAID) array, etc. The removable storage drive 514 may, e.g., but not limited to, read from and/or write to a removable storage unit 518 in a well-known manner. Removable storage unit 518, also called a program storage device or a computer program product, may represent, e.g., but not limited to, a floppy disk, magnetic tape, optical disk, compact disk, etc. which may be read from and written to by removable storage drive 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, but not limited to, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 522 and interfaces 520, which may allow software and/or data to be transferred from the removable storage unit 522 to computer system 500.

The computing device 500 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 500 may also include an input device such as, e.g., (but not limited to) a mouse or other pointing device such as a digitizer, touch-based sensor, and/or a keyboard and/or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot and card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to, a channel). This channel 526 may carry signals 528, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over any of various physical media, fiber optics, a telephone line, twisted pair, shielded twisted pair, a cellular link, a radio frequency (RF) link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, tensorflow and openAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 507, and/or electronic interactive, graphical user interface (GUI) system. Each of the exemplary DSS, DBMS and/or EIGUI system, can then, using e.g., but not limited to, a cryptographic processor and/or a crypto chip controller processor 536, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 6 depicts an example application server and web server network architecture including an example fully meshed, redundant communications network load balancing application server architecture as may be used for an example SmartHub system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SmartPass NFT authentication systems, notification systems, request response systems, financing request systems, collateralized NFT request response systems, etc. to example service devices using an example network infrastructure, according to an example embodiment of the present invention. FIG. 6 depicts an exemplary schematic block diagram 600 illustrating an exemplary communications network device hardware architecture 600 showing exemplary network devices including exemplary application server devices 602, exemplary storage devices 606, web server devices 608, all coupled to an exemplary communications network 604, which may be coupled to other devices such as, e.g., but not limited to, a cyber security network security operations environment device or devices 604, and other end user and other internal and/or external user computing and/or communications devices 610, which may be coupled to the network communications environment 604 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 600 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various block chain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example embodiment, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of providing for a transaction on a blockchain for conditionally assigned regulatory criteria, comprising at least one electronic computer processor coupled to at least one electronic memory storage device and coupled via at least one communications network interface to at least one data communications network, the method comprising:
   electronically receiving, by the at least one electronic computer processor, at least one regulatory document via at least one or more of:
      at least one graphical user interface (GUI),
      at least one Internet Of Things (IoT) message interface, or
      at least one application programming interface (API);
   electronically receiving, by the at least one electronic computer processor, at least one applicable payment via the at least one or more of:
      the at least one GUI,
      the at least one IoT message interface, or
      the at least one API;
   electronically storing, by the at least one electronic computer processor, said at least one regulatory document and said at least one applicable payment in at least one data store comprising at least one or more of:
      at least one cloud based or on premise storage;
      at least one node of the at least one data communications network; or
      at least one storage system;
   electronically transferring, by the at least one electronic computer processor, via at least one or more of:
      at least one blockchain user interface, or
      at least one blockchain gateway API from said at least one data store;
   electronically processing, by the at least one electronic computer processor, data stipulated as at least one conditionally assigned regulatory criteria on at least one or more of:
      at least one blockchain; or
      at least one distributed ledger technology (DLT) comprising routing and adding IoT data to the asset record when conditions are met;
   electronically authenticating, by the at least one electronic computer processor, said data with at least one electronic timestamp, and
   encoding, by the at least one electronic computer processor, with at least one encoder,
      wherein said electronically authenticating said data with said at least one electronic timestamp, and said encoding, by the at least one electronic computer processor, with said at least one encoder, comprises at least one or more of:
   a) electronically providing that all said regulatory documents and said at least one applicable payment, when required, comprise:
      electronically receiving in a digital form, from any of the at least one permissioned participant, wherein the at least one permissioned participant comprises an authorizing agent to at least one data storage unit, and
      wherein said at least one data storage unit comprises:
         electronically authenticating at least one item as accurate, and are selected as conditions necessary to fulfill said at least one conditionally assigned regulatory criteria as stipulated in a self-executing automation platform; and
         electronically allowing authorizing said at least one permissioned participant to electronically determine final disposition of said at least one item,
      wherein said at least one item comprises:
         at least one product, or
         at least one good,
      in a supply chain; or
   b) electronically enabling customs clearance to verify accuracy of said at least one regulatory document for at least one product or good, wherein said customs clearance comprises:
      providing an evaluation process used by at least one nation-state to move said at least one product or good for at least one or more of:
         entry, exit, or transit through the at least one nation-state upon validation of requirements stipulated by the at least one nation-state's at least one or more of:
            laws,
            regulations, or
            policies; and
      wherein said electronically enabling the at least one nation-state to perform tailoring of said at least one regulatory document required for said custom clearance, and
      wherein a general clearance process comprises:
         a process comprising:
            electronically enable displaying or electronic storing of electronic information; and
            electronically enabling a summarized electronic workflow for permissioned participants of at least one import comprising:
               electronically identifying at least one shipment of at least one good arriving at a port for entry;
               electronically displaying to at least one customs officer for examination at least one regulatory document in a digital or electronic format, said at least one regulatory document associated with the at least one good and any specified import duties or taxes, if any;
               electronically determining whether trade requirements for customs approval are satisfied, and either:
                  when determined unsatisfied, then shipment is at least one or more of: detained or returned until at least one or more of:
                     a customs broker,
                     the buyer, seller, or a financing representative, reconciles trade requirements; or when determined satisfied, after reconciliation, customs performs clearing the at least one good for entry into the country or transit through the nation-state to reach a final destination; and providing all said at least one document and said at least one applicable payment, if required, are received in a digital form, and electronically presenting to the at least one authorizing permission participant and all of the at least one permissioned participants in the transaction are enabled to transmit digital data information, according to any required of said at least one conditionally assigned regulatory fulfillment criteria;

electronically updating, by the at least one electronic computer processor, at least one data record of said data, comprising adding IoT data to the asset record comprising at least one or more of: at least one blockchain entry comprising at least one Non-Fungible Token (NFT), or at least one cryptographically linked off-chain entry, configured to manage regulatory fulfillment, when said at least one conditionally assigned regulatory criteria is fulfilled; and electronically notifying, by the at least one computer processor, via the at least one GUI at least one or more of:

at least one permissioned participant; or at least one authorizing permissioned participant.

2. The method according to claim 1, wherein said adding IoT data to the asset record comprises adding the on-chain NFT and adding the cryptographically linked off-chain entry, and wherein a relationship between the on-chain NFT and the cryptographically linked off-chain entry is made possible by each containing a hash on the data, wherein the hash comprises an identically computed value, and having related cryptographic keys.

3. The method according to claim 1, further comprising:

attesting or verifying attestation, by a computing device equipped with digital signature capabilities, wherein authenticity and integrity of a document is verified using cryptographic techniques or verifying of attestation involves cross-referencing digital signatures with a trusted authority's public key or employing a decentralized consensus mechanism within a blockchain network, confirming validity of the attestation with the evidence of the attestation recorded on the blockchain.

4. The method according to claim 1, further comprising:

synchronizing between authenticated documents and information and criteria stipulated in a rule set and reflected in a smart contract.

5. The method according to claim 1, further comprising:

reducing rejection of movement of goods, services, or products for importation, exportation, or transit for nation-states, and addressing inaccurate or missing information comprising at least one or more of:

Harmonized Tariff Schedule (HTS),

Export Control Classification Number (ECCN) codes, or inaccurate or antiquated market valuation of consignment.

6. The method of claim 1, wherein, said at least one regulatory document, comprises at least one or more of:

wherein said regulatory fulfillment relates to customs approval of at least one imported good; or at least one commerce trade regulatory document comprising at least one or more of:

at least one bill of lading, at least one electronic product code information services (EPCIS) supply chain tracking status, or at least one invoice.

7. The method of claim 1, wherein, said electronically processing said data stipulated as said at least one conditionally assigned regulatory criteria, comprises:

electronically processing at least one verifiable external factor wherein said at least one verifiable external factor comprises at least one or more of:

at least one IoT data, at least one shipment location, said at least one regulatory document, or at least one condition required to obtain approval of an import by a customs official.

8. A system of providing for a transaction on a blockchain for conditionally assigned regulatory criteria, the system comprising:

at least one electronic computer processor, coupled to at least one electronic memory storage device and coupled via at least one communications network interface, coupled to at least one data communications network, the system comprising wherein said at least one electronic computer processor is configured to:

electronically receive, by the at least one electronic computer processor, at least one regulatory document via at least one or more of: at least one graphical user interface (GUI), at least one Internet Of Things (IoT) message interface, or at least one application programming interface (API);

electronically receive at least one applicable payment via the at least one or more of: the at least one GUI, the at least one IoT message interface, or the at least one API;

electronically store said at least one regulatory document and said at least one applicable payment in at least one data store comprising at least one or more of:

at least one cloud based or on premise storage;

at least one node of the at least one data communications network; or at least one storage system;

electronically transfer via at least one or more of: at least one blockchain user interface or at least one blockchain gateway API from said at least one data store;

electronically process data stipulated as at least one conditionally assigned regulatory criteria on at least one or more of:

at least one blockchain; or at least one distributed ledger technology (DLT) including being configured to route and add IoT data to the asset record when conditions are met;

electronically authenticate said data with at least one electronic timestamp, and encode with at least one encoder, wherein said electronically authenticate said data with said at least one electronic timestamp, and said encode with said at least one encoder, comprises being configured to at least one or more of:

a) electronically provide that all said regulatory documents and said at least one applicable payment, when required, comprise being configured to:

electronically receive in a digital form, from any of the at least one permissioned participant, wherein the at least one permissioned participant comprises an authorizing agent to at least one data storage unit, and wherein said at least one data storage unit comprises being configured to:

electronically authenticate at least one item as accurate, and are selected as conditions necessary to fulfill said at least one conditionally assigned regulatory criteria as stipulated in a self-executing automation platform; and electronically allow authorization of said at least one permissioned participant to electronically determine final disposition of said at least one item, wherein said at least one item comprises:

at least one product, or at least one good, in a supply chain; or b) electronically enable customs clearance to verify accuracy of said at least one regulatory document for at least one product or good, wherein said customs clearance comprises being configured to:

provide an evaluation process used by at least one nation-state to move said at least one product or good for at least one or more of:

entry, exit, or transit through the at least one nation-state upon validation of requirements stipulated by the at least one nation-state's at least one or more of:

laws, regulations, or policies; and wherein said electronically enable the at least one nation-state to tailor said at least one regulatory document required for said custom clearance, and wherein a general clearance process comprises being configured to:

provide a process comprising:

computing devices configured to electronically enable display or electronic storage of electronic information; and electronically enable a summarized electronic workflow for permissioned participants of at least one import comprising:

electronically identify at least one shipment of at least one good arriving at a port for entry;

electronically display to at least one customs officer for examination at least one regulatory document in a digital or electronic format, said at least one regulatory document associated with the at least one good and any specified import duties or taxes, if any;

electronically determine whether trade requirements for customs approval are satisfied, and either:

when determined unsatisfied, then shipment is at least one or more of: detained or returned until at least one or more of:

a customs broker, the buyer, seller, or a financing representative, reconciles trade requirements; or when determined satisfied, after reconciliation, customs clears the at least one good for entry into the country or transit through the nation-state to reach a final destination; and provides all said at least one document and said at least one applicable payment, if required, are received in a digital form, and are electronically presented to the at least one authorizing permission participant and all of the at least one permissioned participants in the transaction are enabled to transmit digital data information, according to any required of said at least one conditionally assigned regulatory fulfillment criteria;

electronically update at least one data record of said data comprising at least one or more of: at least as a blockchain entry comprising at least one Non-Fungible Token (NFT) or at least one cryptographically linked off-chain entry, configured to manage regulatory fulfillment, when said at least one conditionally assigned regulatory criteria is fulfilled; and electronically notify via the at least one GUI at least one or more of:

at least one permissioned participant; or at least one authorizing permissioned participant.

9. The system according to claim 8, wherein said system is configured to add the IoT data to the asset record comprises being configured to add the on-chain NFT and the cryptographically linked off-chain entry, and wherein a relationship between the on-chain NFT and the cryptographically linked off-chain entry is made possible by each containing a hash on the data, wherein the hash comprises an identically computed value, and having related cryptographic keys.

10. The system according to claim 8, further comprising wherein the system is configured to: attest or verify attestation, by a computing device equipped with digital signature capabilities, wherein authenticity and integrity of a document is verified using cryptographic techniques or verification of the attestation comprises wherein the system is configured to cross-reference digital signatures with a trusted authority's public key or employ a decentralized consensus mechanism within a blockchain network configured to confirm validity of the attestation with the evidence of the attestation recorded on the blockchain.

11. The system according to claim 8, further comprising wherein the system is configured to:

synchronize between authenticated documents and information and criteria stipulated in a rule set and reflected in a smart contract.

12. The system according to claim 5, further comprising wherein the system is configured to:

reduce rejection of movement of goods, services, or products for importation, exportation, or transit for nation-states, and address inaccurate or missing information comprising at least one or more of:

Harmonized Tariff Schedule (HTS),

Export Control Classification Number (ECCN) codes, or inaccurate or antiquated market valuation of consignment.

13. The system of claim 8, wherein said at least one electronic computer processor is configured to at least one or more of:

said electronically receive said at least one regulatory document, comprises wherein said regulatory fulfillment relates to customs approval of at least one imported good;
said electronically receive said at least one regulatory document, wherein said at least one commerce trade regulatory document comprising at least one or more of:
at least one bill of lading,
at least one electronic product code information services (EPCIS) supply chain tracking status, or
at least one invoice; or
said electronically process said data stipulated as said at least one conditionally assigned regulatory compliance criteria, comprises wherein said at least one electronic computer processor is configured to:
electronically process at least one verifiable external factor wherein said at least one verifiable external factor comprises at least one or more of:
at least one IoT data,
at least one shipment location,
said at least one regulatory document, or
at least one condition required to obtain approval of an import by a customs official.

14. A computer program product embodied on a computer accessible nontransitory storage medium, including at least one instruction, which when executed on at least one electronic computer processor performs a method of providing for a transaction on a blockchain for conditionally assigned regulatory criteria, comprising at least one electronic computer processor coupled to at least one electronic memory storage device and coupled via at least one communications network interface to at least one data communications network, the method comprising:
electronically receiving at least one regulatory document via at least one graphical user interface (GUI), at least one Internet of Things (IoT) message interface, or at least one application programming interface (API);
electronically receiving at least one applicable payment via the at least one GUI, the at least one IoT message interface, or the at least one API;
electronically storing said at least one document and said at least one applicable payment in at least one data store comprising at least one or more of:
at least one cloud based or on premise storage;
at least one node of the at least one data communications network; or
at least one storage system;
electronically transferring via at least one blockchain user interface or at least one blockchain gateway API from said at least one data store;
electronically processing data stipulated as at least one conditionally assigned regulatory criteria on at least one or more of:
at least one blockchain; or
at least one distributed ledger technology (DLT) including routing and adding IoT data to the asset record when conditions are met;
electronically authenticating said data with at least one electronic timestamp, and encoding with at least one encoder,
wherein said electronically authenticating said data with said at least one electronic timestamp, and said encoding with said at least one encoder, comprises at least one or more of:

a) electronically providing that all said regulatory documents and said at least one applicable payment, when required, comprise:
electronically receiving in a digital form, from any of the at least one permissioned participant, wherein the at least one permissioned participant comprises an authorizing agent to at least one data storage unit, and
wherein said at least one data storage unit comprises:
electronically authenticating at least one item as accurate, and are selected as conditions necessary to fulfill said at least one conditionally assigned regulatory criteria as stipulated in a self-executing automation platform; and
electronically allowing authorizing said at least one permissioned participant to electronically determine final disposition of said at least one item,
wherein said at least one item comprises:
at least one product, or
at least one good,
in a supply chain; or
b) electronically enabling customs clearance to verify accuracy of said at least one regulatory document for at least one product or good, wherein said customs clearance comprises:
providing an evaluation process used by at least one nation-state to move said at least one product or good for at least one or more of:
entry, exit, or transit through the at least one nation-state upon validation of requirements stipulated by the at least one nation-state's at least one or more of:
laws,
regulations, or
policies; and
wherein said electronically enabling the at least one nation-state to perform tailoring of said at least one regulatory document required for said custom clearance, and
wherein a general clearance process comprises:
a process comprising:
electronically enable displaying or electronic storing of electronic information; and
electronically enabling a summarized electronic workflow for permissioned participants of at least one import comprising:
electronically identifying at least one shipment of at least one good arriving at a port for entry:
electronically displaying to at least one customs officer for examination at least one regulatory document in a digital or electronic format, said at least one regulatory document associated with the at least one good and any specified import duties or taxes, if any;
electronically determining whether trade requirements for customs approval are satisfied, and either:
when determined unsatisfied, then shipment is at least one or more of: detained or returned until at least one or more of:
a customs broker,
the buyer, seller, or
a financing representative,
reconciles trade requirements; or when determined satisfied, after reconciliation, customs performs clearing the at least one good for entry into the country or transit through the nation-state to reach a final destination; and providing all said at least one document and said at least one applicable payment, if required, are received in a digital form, and electronically presenting to the at least one authorizing permission participant and all of the at least one permissioned participants in the transaction are enabled to transmit digital data information, according to any required of said at least one conditionally assigned regulatory fulfillment criteria;

electronically updating at least one data record of said data comprising adding of IoT data to the asset record comprising at least one or more of: at least one blockchain entry comprising at least one Non-Fungible Token (NFT), or at least one cryptographically linked off-chain entry, configured to manage regulatory fulfillment, when said at least one conditionally assigned regulatory criteria is fulfilled; and electronically notifying via the at least one graphical user interface (GUI) at least one or more of:
at least one permissioned participant; or
at least one authorizing permissioned participant.

15. The computer program product according to claim 14, wherein said method comprises wherein said adding IoT data to the asset record comprises adding the on-chain NFT and adding the cryptographically linked off-chain entry, and wherein a relationship between the on-chain NFT and the cryptographically linked off-chain entry is made possible by each containing a hash on the data, wherein the hash comprises an identically computed value, and having related cryptographic keys.

16. The computer program product according to claim 14, wherein the method further comprises:
attesting or verifying of attesting, by a computing device equipped with digital signature capabilities, wherein authenticity and integrity of a document is verified using cryptographic techniques or verification of the attestation comprises:
cross-referencing digital signatures with a trusted authority's public key or employing a decentralized consensus mechanism within a blockchain network, confirming validity of the attestation with the evidence of the attestation recorded on the blockchain.

17. The computer program product according to claim 14, wherein the method further comprises:
synchronizing between authenticated documents and information and criteria stipulated in a rule set and reflected in a smart contract.

18. The computer program product according to claim 14, wherein said method further comprises:
reducing rejection of movement of goods, services, or products for importation, exportation, or transit for nation-states, and
addressing inaccurate or missing information comprising at least one or more of:
Harmonized Tariff Schedule (HTS),
Export Control Classification Number (ECCN) codes, or
inaccurate or antiquated market valuation of consignment.

19. The computer program product of claim 18, wherein said method comprises at least one or more of:
wherein said at least one regulatory document, comprises at least one or more of:
wherein said regulatory fulfillment relates to customs approval of at least one imported good; or
at least one commerce trade regulatory document comprising at least one or more of:
at least one bill of lading,
at least one electronic product code information services (EPCIS) supply chain tracking status, or
at least one invoice; or
wherein said electronically processing said data stipulated as said at least one conditionally assigned regulatory criteria, comprises:
electronically processing at least one verifiable external factor, wherein said at least one verifiable external factor comprises at least one or more of:
at least one IoT data,
at least one shipment location,
said at least one regulatory document, or
at least one condition required to obtain approval of an import by a customs official.

* * * * *